July 9, 1929.　　　　J. W. COX　　　　1,720,072
CONDUIT FITTING
Filed March 27, 1925
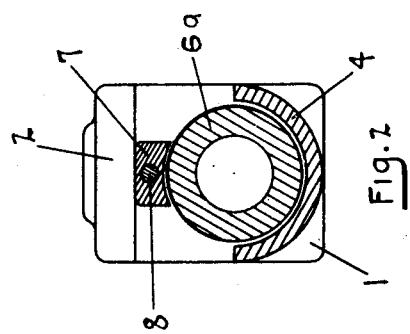
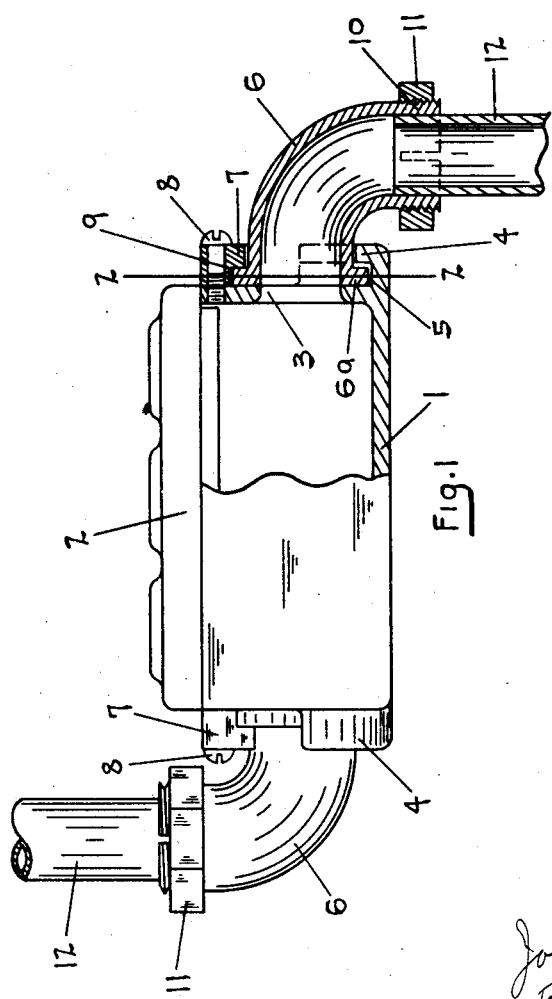

Patented July 9, 1929.

1,720,072

UNITED STATES PATENT OFFICE.

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed March 27, 1925. Serial No. 18,805.

This invention is designed to improve conduit fittings. With such fittings it is often desirable to make a connection with the fitting in difficult positions both as to direction leading from the fitting and also as to distance to and from the fitting with relation to the conduit leading from fixed positions in which the conduit is already placed. It is also desirable to provide fittings which may be adjusted so as to fit different locations. In the present construction the fitting is formed so that the outlet may be adjustable and may be attached by a direct side motion of the conduit relatively to the fitting. These fittings or outlets may be arranged on the same body. Features and details of the invention will appear from the specification and claim.

The invention is illustrated in the accompanying drawings as follows:—

Fig. 1 shows a side elevation, partly in section.

Fig. 2 a section on the line 2—2 in Fig. 1.

1 marks the body which in the exemplification of the invention is in the form of a conduit box, 2 a conduit box cover, and 3 a conduit outlet opening leading to the box. A lip 4 extends from the face of the box adjacent to the opening having the inturned end 5. A coupling 6 is provided with a flange 6ª at its end which is adapted to seat in the lip 4, the inturned end engaging the face of the flange. The lip is preferably a half circle so as to give as much support to the flange as possible and at the same time permit of the assembling of the parts by a side motion of the flange in the seat formed by the lip.

In order to mount the coupling in the seat formed by the lip I provide a locking block 7 which is secured on the face of the box by a screw 8. This has an inturned end 9 which is adapted to engage the face of the flange. This block not only locks the flange in the seat formed by the lip 4 but also engaging the face of the flange locks the end of the coupling in place endwise. Before the block is set up the joint forms a swivel connection so that where the coupling is in the form of an angle or elbow it may be swung around giving it any direction that may be desired, thus extending the usefulness of a single shape of box.

The outer end of the coupling is screw-threaded at 10 and provided with a nut 11 by means of which the end may be contracted on the end of an inserted threadless conduit, as 12. The end of the coupling is preferably slotted as shown in dotted lines so that the end may be readily contracted.

It will be noted that with the conduit in place in the coupling regardless of the direction of the couplings 6, the coupling may be swung sidewise into the seat formed by the lip, thus facilitating the connection where a conduit has become fixed in position and particularly where the box has become fixed through other connections with other outlets.

What I claim as new is:—

In a conduit fitting, the combination of a body having an opening with a projecting inturned lip at the opening; an elbow flanged coupling seated in the lip; and means locking the flange in the lip comprising a projection extending over the face of the flange.

In testimony whereof I have hereunto set my hand.

JOHN WILLIAM COX.